United States Patent
Chang et al.

(10) Patent No.: US 9,110,269 B2
(45) Date of Patent: Aug. 18, 2015

(54) OPTICAL IMAGING LENS AND ELECTRONIC DEVICE COMPRISING THE SAME

(71) Applicants: Chung-Chih Chang, Taichung (TW); Hung-Chien Hsieh, Taichung (TW); Kai Lun Wang, Taichung (TW)

(72) Inventors: Chung-Chih Chang, Taichung (TW); Hung-Chien Hsieh, Taichung (TW); Kai Lun Wang, Taichung (TW)

(73) Assignee: Genius Electronics Optical Co., Ltd., Central Taiwan Science Park, Daya District, Taichung (TW)

( * ) Notice: Subject to any disclaimer, the term of this patent is extended or adjusted under 35 U.S.C. 154(b) by 0 days.

(21) Appl. No.: 14/251,662

(22) Filed: Apr. 14, 2014

(65) Prior Publication Data

US 2015/0138421 A1    May 21, 2015

(30) Foreign Application Priority Data

Nov. 15, 2013 (CN) .......................... 2013 1 0578911

(51) Int. Cl.
*G02B 13/00* (2006.01)
*G02B 9/60* (2006.01)
*H04N 5/225* (2006.01)

(52) U.S. Cl.
CPC .............. *G02B 13/0015* (2013.01); *G02B 9/60* (2013.01); *H04N 5/2252* (2013.01); *H04N 5/2253* (2013.01)

(58) Field of Classification Search
CPC . H04N 5/2252; H04N 5/2253; H04N 5/2254; H04N 5/23212; G02B 13/0045; G02B 13/18; G02B 13/04; G02B 3/04; G02B 13/0015; G02B 9/60
See application file for complete search history.

(56) References Cited

U.S. PATENT DOCUMENTS

| | | | |
|---|---|---|---|
| 7,480,105 B2 * | 1/2009 | Mori | 359/770 |
| 7,486,449 B2 | 2/2009 | Miyano | |
| 7,639,432 B2 | 12/2009 | Asami | |
| 7,684,127 B2 | 3/2010 | Asami | |
| 8,000,030 B2 | 8/2011 | Tang | |
| 8,000,031 B1 * | 8/2011 | Tsai | 359/714 |
| 8,179,615 B1 * | 5/2012 | Tang et al. | 359/714 |
| 8,233,224 B2 | 7/2012 | Chen | |
| 8,310,768 B2 | 11/2012 | Lin et al. | |
| 8,334,922 B2 * | 12/2012 | Shinohara | 348/340 |
| 8,363,337 B2 | 1/2013 | Tang et al. | |
| 8,976,466 B2 * | 3/2015 | Otsu et al. | 359/764 |
| 2010/0254029 A1 | 10/2010 | Shinohara | |
| 2012/0182627 A1 | 7/2012 | Chen | |
| 2012/0188655 A1 | 7/2012 | Tsai et al. | |
| 2013/0135755 A1 | 5/2013 | Ise et al. | |

FOREIGN PATENT DOCUMENTS

| | | |
|---|---|---|
| JP | 2012208326 | 10/2012 |
| TW | 201250284 | 12/2012 |
| TW | 201303411 | 1/2013 |

* cited by examiner

*Primary Examiner* — Luong T Nguyen
(74) *Attorney, Agent, or Firm* — Winston Hsu; Scott Margo

(57) ABSTRACT

An optical imaging lens set includes a first lens with positive refractive power and a convex object-side surface, a second lens element with negative refractive power and an image-side surface with a concave portion in a vicinity of its periphery, a third lens element has an object-side surface with a concave portion in a vicinity of its periphery, a fourth lens element with positive refractive power, a concave object-side surface and a convex image-side surface, a fifth lens element with an object-side with a convex portion in a vicinity of the optical axis, an image-side surface with a concave portion in a vicinity of the optical axis and a convex portion in a vicinity of its periphery.

17 Claims, 25 Drawing Sheets

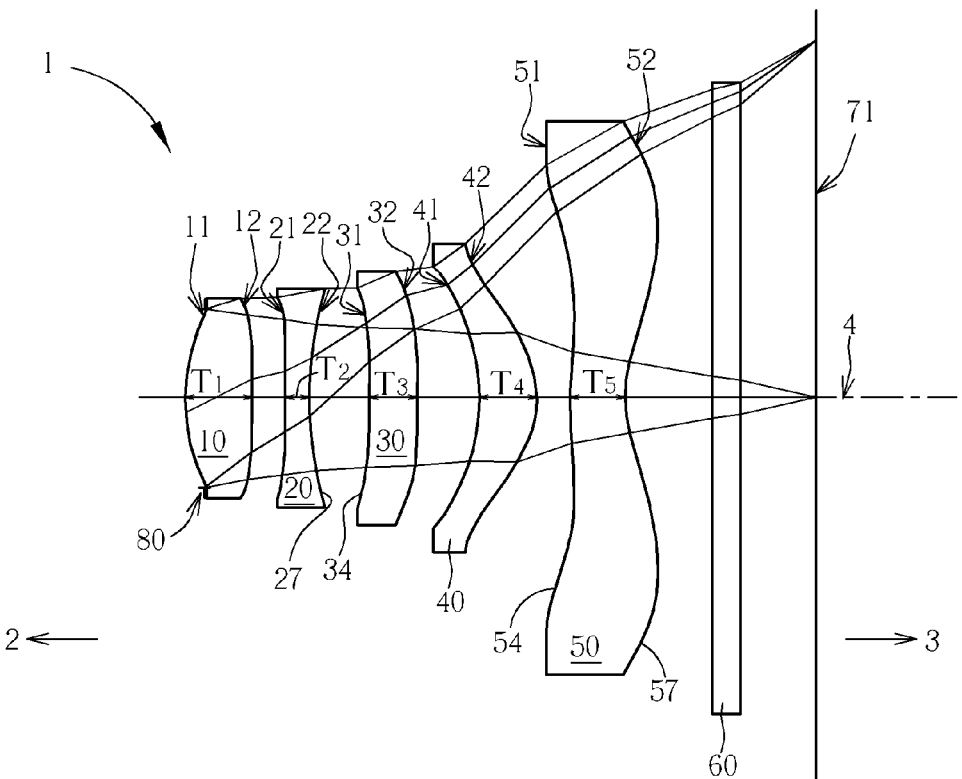
FIG. 3
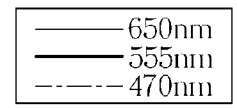
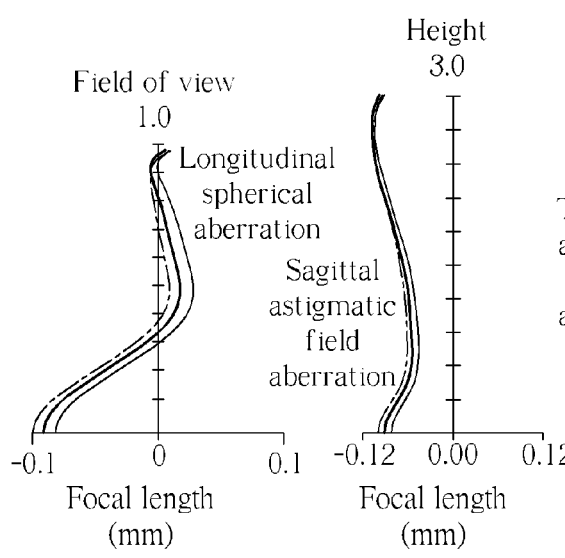
FIG. 4A   FIG. 4B   FIG. 4C   FIG. 4D

| | | First Example | | | | | |
|---|---|---|---|---|---|---|---|
| | | F= 3.341 mm, HFOV= 39.891 deg., Fno= 2.200 | | | | | |
| No. | | Curvature Radius | Ape. Stop Distance Lens Thickness Air Gap | Refractive Index | Abbe No. | Focal Length | Material |
| | Object | Infinite | 100.000 | | | | |
| 80 | Ape. Stop | Infinite | -0.150 | | | | |
| 11 | First Lens | 1.663 | 0.656 $T_1$ | 1.544 | 56.114 | 2.730 | Plastic |
| 12 | | -12.380 | 0.072 $G_{12}$ | | | | |
| 21 | Second Lens | -13.566 | 0.210 $T_2$ | 1.640 | 23.529 | -4.978 | Plastic |
| 22 | | 4.228 | 0.279 $G_{23}$ | | | | |
| 31 | Third Lens | -23.915 | 0.398 $T_3$ | 1.544 | 56.114 | 27.431 | Plastic |
| 32 | | -9.263 | 0.311 $G_{34}$ | | | | |
| 41 | Fourth Lens | -1.640 | 0.475 $T_4$ | 1.535 | 55.712 | 2.521 | Plastic |
| 42 | | -0.816 | 0.193 $G_{45}$ | | | | |
| 51 | Fifth Lens | 3.795 | 0.502 $T_5$ | 1.531 | 55.744 | -2.548 | Plastic |
| 52 | | 0.954 | 0.487 | | | | |
| 60 | Filter | Infinite | 0.210 | | | | |
| | Filter -Image Plane | Infinite | 0.752 | | | | |
| 71 | Image Plane | Infinite | | | | | |

FIG. 18

| No. | 11 | 12 | 21 | 22 | 31 |
|---|---|---|---|---|---|
| K | -1.100E+01 | 1.433E+02 | 2.325E+02 | -1.143E+01 | 2.180E+02 |
| a4 | 2.400E-01 | 4.542E-02 | 7.299E-02 | 7.415E-02 | -8.848E-02 |
| a6 | -1.275E-01 | -1.882E-01 | -1.105E-01 | -7.494E-02 | -1.562E-01 |
| a8 | -2.260E-01 | 2.054E-01 | -8.175E-02 | 1.661E-01 | 1.725E-01 |
| a10 | 4.749E-01 | -6.718E-01 | -3.173E-01 | -4.557E-01 | 5.321E-02 |
| a12 | -1.364E-01 | 2.008E-01 | 2.180E-01 | 5.272E-01 | -2.549E-01 |
| a14 | -3.139E-01 | 8.615E-01 | 1.833E-01 | -2.948E-01 | 3.462E-01 |
| a16 | 1.112E-01 | -5.975E-01 | 1.077E-01 | 5.426E-02 | -1.947E-01 |
| No. | 32 | 41 | 42 | 51 | 52 |
| K | 1.923E+00 | -1.126E+00 | -8.300E-01 | -1.518E+02 | -6.763E+00 |
| a4 | -2.074E-02 | 8.765E-03 | 1.965E-01 | -6.422E-02 | -7.121E-02 |
| a6 | -1.394E-01 | 3.523E-02 | -1.002E-01 | 6.159E-03 | 2.329E-02 |
| a8 | 3.466E-02 | 9.842E-03 | 8.664E-02 | 3.434E-03 | -6.618E-03 |
| a10 | 8.604E-02 | -1.001E-01 | 1.179E-04 | -7.069E-04 | 1.061E-03 |
| a12 | -1.814E-01 | 1.736E-02 | -1.476E-02 | 2.196E-05 | -6.225E-05 |
| a14 | 7.934E-02 | 2.253E-02 | 2.710E-03 | 3.616E-06 | -6.346E-06 |
| a16 | 3.178E-02 | 1.904E-03 | 6.570E-05 | -1.824E-07 | 8.807E-07 |

FIG. 19

| Second Example | | | | | | | |
|---|---|---|---|---|---|---|---|
| F= 3.278 mm, HFOV= 41.139 deg., Fno= 2.200 | | | | | | | |
| No. | | Curvature Radius | Ape. Stop Distance Lens Thickness Air Gap | Refractive Index | Abbe No. | Focal Length | Material |
|  | Object | Infinite | Infinite |  |  |  |  |
| 80 | Ape. Stop | Infinite | -0.150 |  |  |  |  |
| 11 | First Lens | 1.672 | 0.553 $T_1$ | 1.544 | 56.114 | 2.736 | Plastic |
| 12 |  | -12.351 | 0.074 $G_{12}$ |  |  |  |  |
| 21 | Second Lens | -13.416 | 0.211 $T_2$ | 1.640 | 23.529 | -4.921 | Plastic |
| 22 |  | 4.180 | 0.268 $G_{23}$ |  |  |  |  |
| 31 | Third Lens | -28.934 | 0.408 $T_3$ | 1.544 | 56.114 | 19.478 | Plastic |
| 32 |  | -7.815 | 0.278 $G_{34}$ |  |  |  |  |
| 41 | Fourth Lens | -1.603 | 0.484 $T_4$ | 1.535 | 55.712 | 2.609 | Plastic |
| 42 |  | -0.826 | 0.272 $G_{45}$ |  |  |  |  |
| 51 | Fifth Lens | 3.812 | 0.467 $T_5$ | 1.531 | 55.744 | -2.591 | Plastic |
| 52 |  | 0.970 | 0.500 |  |  |  |  |
| 60 | Filter | Infinite | 0.210 |  |  |  |  |
|  | Filter -Image Plane | Infinite | 0.662 |  |  |  |  |
| 71 | Image Plane | Infinite |  |  |  |  |  |

FIG. 20

| No. | 11 | 12 | 21 | 22 | 31 |
|---|---|---|---|---|---|
| K | -1.151E+01 | 1.526E+02 | 2.303E+02 | -1.039E+01 | 1.940E+02 |
| a4 | 2.386E-01 | 4.582E-02 | 7.878E-02 | 7.553E-02 | -8.715E-02 |
| a6 | -1.323E-01 | -1.940E-01 | -1.010E-01 | -6.992E-02 | -1.498E-01 |
| a8 | -2.368E-01 | 1.992E-01 | -7.863E-02 | 1.746E-01 | 1.770E-01 |
| a10 | 4.642E-01 | -6.780E-01 | -3.106E-01 | -4.524E-01 | 5.550E-02 |
| a12 | -1.433E-01 | 1.964E-01 | 2.315E-01 | 5.272E-01 | -2.542E-01 |
| a14 | -3.268E-01 | 8.626E-01 | 2.023E-01 | -2.936E-01 | 3.465E-01 |
| a16 | 5.136E-02 | -5.877E-01 | 1.350E-01 | 5.930E-02 | -1.928E-01 |
| No. | 32 | 41 | 42 | 51 | 52 |
| K | -1.365E+01 | -1.393E+00 | -8.290E-01 | -2.318E+02 | -6.885E+00 |
| a4 | -1.549E-02 | 1.407E-02 | 1.946E-01 | -6.390E-02 | -7.021E-02 |
| a6 | -1.382E-01 | 3.082E-02 | -9.866E-02 | 6.226E-03 | 2.353E-02 |
| a8 | 3.343E-02 | 6.946E-03 | 8.745E-02 | 3.445E-03 | -6.589E-03 |
| a10 | 8.478E-02 | -1.005E-01 | 1.885E-04 | -7.055E-04 | 1.061E-03 |
| a12 | -1.820E-01 | 1.770E-02 | -1.483E-02 | 2.208E-05 | -6.260E-05 |
| a14 | 7.944E-02 | 2.297E-02 | 2.665E-03 | 3.633E-06 | -6.376E-06 |
| a16 | 3.218E-02 | 2.283E-03 | 5.683E-05 | -1.702E-07 | 8.882E-07 |

FIG. 21

| Third Example | | | | | | |
|---|---|---|---|---|---|---|
| F= 3.408 mm, HFOV= 40.338 deg., Fno= 2.200 | | | | | | |
| No. | | Curvature Radius | Ape. Stop Distance Lens Thickness Air Gap | Refractive Index | Abbe No. | Focal Length | Material |
| | Object | | | | | | |
| 80 | Ape. Stop | Infinite | Infinite | | | | |
| 11 | First Lens | Infinite | -0.147 $T_1$ | 1.544 | 56.114 | 2.702 | Plastic |
| 12 | | 1.655 | 0.544 $G_{12}$ | | | | |
| 21 | Second Lens | -11.999 | 0.073 $T_2$ | 1.640 | 23.529 | -4.974 | Plastic |
| 22 | | -13.592 | 0.237 $G_{23}$ | | | | |
| 31 | Third Lens | 4.225 | 0.294 $T_3$ | 1.544 | 56.114 | 25.434 | Plastic |
| 32 | | -13.654 | 0.411 $G_{34}$ | | | | |
| 41 | Fourth Lens | -6.958 | 0.287 $T_4$ | 1.535 | 55.712 | 2.604 | Plastic |
| 42 | | -1.622 | 0.490 $G_{45}$ | | | | |
| 51 | Fifth Lens | -0.830 | 0.343 $T_5$ | 1.531 | 55.744 | -2.477 | Plastic |
| 52 | | 0.980 | 0.500 | | | | |
| 60 | Filter | Infinite | 0.210 | | | | |
| | Filter -Image Plane | Infinite | 0.638 | | | | |
| 71 | Image Plane | Infinite | | | | | |

FIG. 22

| No. | 11 | 12 | 21 | 22 | 31 |
|---|---|---|---|---|---|
| K | -1.120E+01 | 1.608E+02 | 2.246E+02 | -9.712E+00 | -7.356E+01 |
| a4 | 2.402E-01 | 4.400E-02 | 7.171E-02 | 7.632E-02 | -8.493E-02 |
| a6 | -1.316E-01 | -1.917E-01 | -1.118E-01 | -7.259E-02 | -1.504E-01 |
| a8 | -2.355E-01 | 1.900E-01 | -8.962E-02 | 1.717E-01 | 1.756E-01 |
| a10 | 4.654E-01 | -6.978E-01 | -3.262E-01 | -4.474E-01 | 5.388E-02 |
| a12 | -1.445E-01 | 1.742E-01 | 2.107E-01 | 5.346E-01 | -2.549E-01 |
| a14 | -3.381E-01 | 8.450E-01 | 1.786E-01 | -2.922E-01 | 3.492E-01 |
| a16 | 1.134E-02 | -5.998E-01 | 1.169E-01 | 4.475E-02 | -1.826E-01 |
| No. | 32 | 41 | 42 | 51 | 52 |
| K | -2.162E+01 | -1.338E+00 | -8.310E-01 | -2.455E+02 | -6.597E+00 |
| a4 | -1.840E-02 | 1.282E-02 | 1.953E-01 | -6.383E-02 | -7.023E-02 |
| a6 | -1.428E-01 | 3.059E-02 | -9.822E-02 | 6.227E-03 | 2.356E-02 |
| a8 | 3.116E-02 | 7.086E-03 | 8.768E-02 | 3.445E-03 | -6.588E-03 |
| a10 | 8.374E-02 | -1.004E-01 | 3.053E-04 | -7.058E-04 | 1.061E-03 |
| a12 | -1.825E-01 | 1.773E-02 | -1.477E-02 | 2.200E-05 | -6.264E-05 |
| a14 | 7.912E-02 | 2.298E-02 | 2.695E-03 | 3.615E-06 | -6.379E-06 |
| a16 | 3.180E-02 | 2.315E-03 | 7.067E-05 | -1.734E-07 | 8.885E-07 |

FIG. 23

| | Fourth Example | | | | | |
|---|---|---|---|---|---|---|
| F= 3.306 mm, HFOV= 40.661 deg., Fno= 2.200 | | | | | | |
| No. | | Curvature Radius | Ape. Stop Distance Lens Thickness Air Gap | Refractive Index | Abbe No. | Focal Length | Material |
| | Object | | | | | | |
| 80 | Ape. Stop | Infinite | Infinite | | | | Plastic |
| 11 | First Lens | Infinite | -0.138 $T_1$ | 1.544 | 56.114 | 2.705 | |
| 12 | | 1.657 | 0.543 $G_{12}$ | | | | |
| 21 | Second Lens | -11.970 | 0.067 $T_2$ | 1.640 | 23.529 | -4.985 | Plastic |
| 22 | | -13.634 | 0.223 $G_{23}$ | | | | |
| 31 | Third Lens | 4.231 | 0.291 $T_3$ | 1.544 | 56.114 | 20.907 | Plastic |
| 32 | | -17.105 | 0.413 $G_{34}$ | | | | |
| 41 | Fourth Lens | -6.904 | 0.288 $T_4$ | 1.535 | 55.712 | 2.601 | Plastic |
| 42 | | -1.621 | 0.493 $G_{45}$ | | | | |
| 51 | Fifth Lens | -0.830 | 0.313 $T_5$ | 1.531 | 55.744 | -2.502 | Plastic |
| 52 | | 0.969 | 0.500 | | | | |
| 60 | Filter | Infinite | 0.210 | | | | |
| | Filter -Image Plane | Infinite | 0.638 | | | | |
| 71 | Image Plane | Infinite | | | | | |

FIG. 24

| No. | 11 | 12 | 21 | 22 | 31 |
|---|---|---|---|---|---|
| K | -1.120E+01 | 1.608E+02 | 2.246E+02 | -9.712E+00 | -7.356E+01 |
| a4 | 2.402E-01 | 4.400E-02 | 7.171E-02 | 7.632E-02 | -8.493E-02 |
| a6 | -1.316E-01 | -1.917E-01 | -1.118E-01 | -7.259E-02 | -1.504E-01 |
| a8 | -2.355E-01 | 1.900E-01 | -8.962E-02 | 1.717E-01 | 1.756E-01 |
| a10 | 4.654E-01 | -6.978E-01 | -3.262E-01 | -4.474E-01 | 5.388E-02 |
| a12 | -1.445E-01 | 1.742E-01 | 2.107E-01 | 5.346E-01 | -2.549E-01 |
| a14 | -3.381E-01 | 8.450E-01 | 1.786E-01 | -2.922E-01 | 3.492E-01 |
| a16 | 1.134E-02 | -5.998E-01 | 1.169E-01 | 4.475E-02 | -1.826E-01 |
| No. | 32 | 41 | 42 | 51 | 52 |
| K | -2.162E+01 | -1.338E+00 | -8.310E-01 | -2.455E+02 | -6.597E+00 |
| a4 | -1.840E-02 | 1.282E-02 | 1.953E-01 | -6.383E-02 | -7.023E-02 |
| a6 | -1.428E-01 | 3.059E-02 | -9.822E-02 | 6.227E-03 | 2.356E-02 |
| a8 | 3.116E-02 | 7.086E-03 | 8.768E-02 | 3.445E-03 | -6.588E-03 |
| a10 | 8.374E-02 | -1.004E-01 | 3.053E-04 | -7.058E-04 | 1.061E-03 |
| a12 | -1.825E-01 | 1.773E-02 | -1.477E-02 | 2.200E-05 | -6.264E-05 |
| a14 | 7.912E-02 | 2.298E-02 | 2.695E-03 | 3.615E-06 | -6.379E-06 |
| a16 | 3.180E-02 | 2.315E-03 | 7.067E-05 | -1.734E-07 | 8.885E-07 |

FIG. 25

| Fifth Example | | | | | | | |
|---|---|---|---|---|---|---|---|
| F= 3.550 mm, HFOV= 38.690 deg., Fno= 2.200 | | | | | | | |
| No. | | Curvature Radius | Ape. Stop Distance Lens Thickness Air Gap | Refractive Index | Abbe No. | Focal Length | Material |
| | Object | | | | | | |
| 80 | Ape. Stop | Infinite | Infinite | | | | |
| 11 | First Lens | Infinite | -0.284 $T_1$ | 1.544 | 56.114 | 2.382 | Plastic |
| 12 | | 1.379 | 0.518 $G_{12}$ | | | | |
| 21 | Second Lens | -19.847 | 0.073 $T_2$ | 1.640 | 23.529 | -3.507 | Plastic |
| 22 | | -24.816 | 0.157 $G_{23}$ | | | | |
| 31 | Third Lens | 2.501 | 0.242 $T_3$ | 1.544 | 56.114 | 11.949 | Plastic |
| 32 | | 17.666 | 0.350 $G_{34}$ | | | | |
| 41 | Fourth Lens | -10.270 | 0.532 $T_4$ | 1.531 | 55.744 | 2.992 | Plastic |
| 42 | | -1.592 | 0.500 $G_{45}$ | | | | |
| 51 | Fifth Lens | -0.884 | 0.273 $T_5$ | 1.544 | 56.114 | -2.499 | Plastic |
| 52 | | 1.266 | 0.500 | | | | |
| 60 | Filter | Infinite | 0.210 | | | | |
| | Filter -Image Plane | Infinite | 0.414 | | | | |
| 71 | Image Plane | Infinite | | | | | |

FIG. 26

| No. | 11 | 12 | 21 | 22 | 31 |
|---|---|---|---|---|---|
| K | -6.126E+00 | 4.005E+02 | 2.689E+02 | -7.713E+00 | 0.000E+00 |
| a4 | 2.600E-01 | 7.946E-02 | 8.491E-02 | 9.092E-02 | -1.231E-01 |
| a6 | -7.458E-02 | -6.562E-02 | -3.849E-04 | 9.936E-03 | -1.730E-01 |
| a8 | -1.946E-01 | 1.508E-01 | 4.868E-02 | 1.984E-01 | 1.695E-01 |
| a10 | 3.920E-01 | -4.152E-01 | -3.371E-01 | -5.024E-01 | -2.146E-02 |
| a12 | -1.377E-01 | 5.103E-02 | 3.615E-02 | 5.285E-01 | -4.624E-01 |
| a14 | -8.158E-02 | 6.159E-02 | 3.517E-02 | -9.424E-02 | 2.506E-01 |
| a16 | -1.267E-01 | -1.929E-02 | 9.284E-02 | 0 | 5.807E-01 |
| No. | 32 | 41 | 42 | 51 | 52 |
| K | 6.992E+01 | -9.964E-01 | -8.172E-01 | -7.579E+03 | -7.964E+00 |
| a4 | -3.765E-02 | -8.285E-03 | 1.899E-01 | -4.878E-02 | -6.027E-02 |
| a6 | -1.452E-01 | 1.420E-02 | -1.028E-01 | 7.158E-03 | 2.103E-02 |
| a8 | 8.854E-02 | 2.524E-02 | 7.720E-02 | 1.945E-03 | -6.222E-03 |
| a10 | 2.711E-02 | -7.330E-02 | -4.233E-03 | -7.013E-04 | 9.257E-04 |
| a12 | -1.735E-01 | 1.841E-02 | -1.150E-02 | 7.188E-05 | -4.697E-05 |
| a14 | 4.376E-02 | 1.353E-02 | 2.364E-03 | -1.384E-06 | -4.492E-06 |
| a16 | 1.301E-01 | -5.309E-03 | 0 | -6.628E-08 | 5.252E-07 |

FIG. 27

| | | Sixth Example | | | | | |
|---|---|---|---|---|---|---|---|
| | | F= 3.554 mm, HFOV= 38.577 deg., Fno= 2.200 | | | | | |
| No. | | Curvature Radius | Ape. Stop Distance Lens Thickness Air Gap | Refractive Index | Abbe No. | Focal Length | Material |
| | Object | Infinite | Infinite | | | | |
| 80 | Ape. Stop | Infinite | -0.266 | | | | |
| 11 | First Lens | 1.367 | 0.532 $T_1$ | 1.544 | 56.114 | 2.357 | Plastic |
| 12 | | -19.039 | 0.047 $G_{12}$ | | | | |
| 21 | Second Lens | -28.083 | 0.208 $T_2$ | 1.640 | 23.529 | -3.694 | Plastic |
| 22 | | 2.610 | 0.337 $G_{23}$ | | | | |
| 31 | Third Lens | -86.212 | 0.273 $T_3$ | 1.544 | 56.114 | 21.580 | Plastic |
| 32 | | -10.377 | 0.438 $G_{34}$ | | | | |
| 41 | Fourth Lens | -1.469 | 0.495 $T_4$ | 1.531 | 55.744 | 3.165 | Plastic |
| 42 | | -0.877 | 0.377 $G_{45}$ | | | | |
| 51 | Fifth Lens | 4.207 | 0.439 $T_5$ | 1.544 | 56.114 | -2.885 | Plastic |
| 52 | | 1.104 | 0.500 | | | | |
| 60 | Filter | Infinite | 0.210 | | | | |
| | Filter -Image Plane | Infinite | 0.508 | | | | |
| 71 | Image Plane | Infinite | | | | | |

FIG. 28

| No. | 11 | 12 | 21 | 22 | 31 |
|---|---|---|---|---|---|
| K | -6.124E+00 | 2.626E+02 | 1.372E+02 | -6.726E+00 | 2.343E+03 |
| a4 | 2.630E-01 | 8.295E-02 | 8.625E-02 | 9.903E-02 | -1.155E-01 |
| a6 | -6.805E-02 | -4.863E-02 | -4.883E-03 | 2.409E-02 | -1.769E-01 |
| a8 | -1.880E-01 | 1.662E-01 | 5.203E-02 | 1.893E-01 | 1.827E-01 |
| a10 | 3.944E-01 | -4.149E-01 | -3.289E-01 | -5.406E-01 | -6.541E-03 |
| a12 | -1.396E-01 | 3.380E-02 | 3.303E-02 | 4.987E-01 | -4.754E-01 |
| a14 | -7.522E-02 | 4.835E-02 | 1.465E-02 | 2.673E-02 | 1.808E-01 |
| a16 | -6.924E-02 | 4.152E-02 | 1.548E-01 | 0 | 4.367E-01 |
| No. | 32 | 41 | 42 | 51 | 52 |
| K | 7.936E+01 | -1.457E+00 | -8.148E-01 | -1.450E+02 | -7.518E+00 |
| a4 | -3.238E-02 | 5.165E-03 | 1.896E-01 | -4.860E-02 | -6.612E-02 |
| a6 | -1.503E-01 | 2.001E-02 | -1.037E-01 | 7.221E-03 | 2.212E-02 |
| a8 | 8.370E-02 | 1.748E-02 | 7.776E-02 | 1.989E-03 | -6.173E-03 |
| a10 | 2.662E-02 | -7.864E-02 | -4.005E-03 | -6.974E-04 | 9.291E-04 |
| a12 | -1.726E-01 | 1.831E-02 | -1.154E-02 | 7.155E-05 | -4.693E-05 |
| a14 | 4.159E-02 | 1.625E-02 | 2.260E-03 | -1.538E-06 | -4.529E-06 |
| a16 | 1.191E-01 | -1.873E-03 | 0 | -8.738E-08 | 5.199E-07 |

FIG. 29

| Seventh Example ||||||||
| F= 3.339 mm, HFOV= 40.964 deg., Fno= 2.200 ||||||||
| No. | | Curvature Radius | Ape. Stop Distance Lens Thickness Air Gap | Refractive Index | Abbe No. | Focal Length | Material |
| --- | --- | --- | --- | --- | --- | --- | --- |
|  | Object | Infinite | Infinite |  |  |  |  |
| 80 | Ape. Stop | Infinite | -0.150 |  |  |  |  |
| 11 | First Lens | 1.670 | 0.563 $T_1$ | 1.544 | 56.114 | 2.739 | Plastic |
| 12 |  | -12.567 | 0.074 $G_{12}$ |  |  |  |  |
| 21 | Second Lens | -13.601 | 0.210 $T_2$ | 1.640 | 23.529 | -4.951 | Plastic |
| 22 |  | 4.195 | 0.269 $G_{23}$ |  |  |  |  |
| 31 | Third Lens | -21.768 | 0.450 $T_3$ | 1.544 | 56.114 | 23.305 | Plastic |
| 32 |  | -8.088 | 0.311 $G_{34}$ |  |  |  |  |
| 41 | Fourth Lens | -1.695 | 0.446 $T_4$ | 1.535 | 55.712 | 2.501 | Plastic |
| 42 |  | -0.818 | 0.173 $G_{45}$ |  |  |  |  |
| 51 | Fifth Lens | 3.780 | 0.483 $T_5$ | 1.531 | 55.744 | -2.546 | Plastic |
| 52 |  | 0.954 | 0.500 |  |  |  |  |
| 60 | Filter | Infinite | 0.210 |  |  |  |  |
|  | Filter -Image Plane | Infinite | 0.715 |  |  |  |  |
| 71 | Image Plane | Infinite |  |  |  |  |  |

FIG. 30

| No. | 11 | 12 | 21 | 22 | 31 |
|---|---|---|---|---|---|
| K | -1.148E+01 | 1.206E+02 | 2.271E+02 | -1.101E+01 | -4.261E+01 |
| a4 | 2.396E-01 | 5.180E-02 | 8.456E-02 | 7.472E-02 | -8.551E-02 |
| a6 | -1.304E-01 | -1.826E-01 | -8.886E-02 | -7.020E-02 | -1.527E-01 |
| a8 | -2.333E-01 | 2.065E-01 | -7.545E-02 | 1.741E-01 | 1.743E-01 |
| a10 | 4.681E-01 | -6.812E-01 | -3.161E-01 | -4.561E-01 | 5.389E-02 |
| a12 | -1.403E-01 | 1.838E-01 | 2.184E-01 | 5.217E-01 | -2.538E-01 |
| a14 | -3.203E-01 | 8.469E-01 | 1.772E-01 | -2.973E-01 | 3.500E-01 |
| a16 | 8.082E-02 | -5.926E-01 | 8.754E-02 | 6.319E-02 | -1.862E-01 |
| No. | 32 | 41 | 42 | 51 | 52 |
| K | 1.749E+00 | -8.067E-01 | -8.300E-01 | -1.463E+02 | -6.779E+00 |
| a4 | -2.114E-02 | -6.057E-04 | 1.963E-01 | -6.390E-02 | -7.097E-02 |
| a6 | -1.389E-01 | 3.483E-02 | -9.893E-02 | 6.226E-03 | 2.344E-02 |
| a8 | 3.433E-02 | 8.625E-03 | 8.729E-02 | 3.444E-03 | -6.595E-03 |
| a10 | 8.564E-02 | -1.002E-01 | 1.353E-04 | -7.061E-04 | 1.061E-03 |
| a12 | -1.814E-01 | 1.776E-02 | -1.485E-02 | 2.190E-05 | -6.255E-05 |
| a14 | 7.964E-02 | 2.303E-02 | 2.662E-03 | 3.579E-06 | -6.367E-06 |
| a16 | 3.210E-02 | 2.386E-03 | 5.788E-05 | -1.867E-07 | 8.894E-07 |

FIG. 31

| | Example 1 | Example 2 | Example 3 | Example 4 | Example 5 | Example 6 | Example 7 |
|---|---|---|---|---|---|---|---|
| $T_{all}$ | 2.239 | 2.124 | 2.083 | 2.104 | 2.116 | 1.946 | 2.151 |
| $G_{aa}$ | 0.856 | 0.893 | 0.997 | 0.959 | 1.121 | 1.198 | 0.826 |
| BFL | 1.449 | 1.372 | 1.348 | 1.348 | 1.124 | 1.218 | 1.425 |
| $(G_{34}+G_{45})/G_{23}$ | 1.804 | 2.056 | 2.145 | 2.067 | 3.326 | 2.418 | 1.801 |
| $G_{aa}/G_{34}$ | 2.754 | 3.211 | 3.469 | 3.329 | 2.107 | 2.738 | 2.659 |
| $T_1/G_{45}$ | 3.394 | 2.031 | 1.587 | 1.736 | 1.893 | 1.411 | 3.253 |
| $T_5/G_{23}$ | 1.796 | 1.746 | 1.363 | 1.486 | 2.442 | 1.303 | 1.796 |
| $G_{aa}/BFL$ | 0.591 | 0.651 | 0.739 | 0.711 | 0.998 | 0.984 | 0.580 |
| $G_{34}/G_{45}$ | 1.608 | 1.020 | 0.839 | 0.921 | 1.945 | 1.161 | 1.796 |
| $T_{all}/BFL$ | 1.546 | 1.548 | 1.545 | 1.561 | 1.883 | 1.598 | 1.510 |
| $T_{all}/G_{aa}$ | 2.617 | 2.380 | 2.090 | 2.194 | 1.887 | 1.624 | 2.603 |
| $T_4/T_2$ | 2.263 | 2.296 | 2.065 | 2.212 | 3.194 | 2.374 | 2.129 |
| $G_{aa}/G_{23}$ | 3.063 | 3.334 | 3.394 | 3.298 | 4.629 | 3.557 | 3.076 |
| $(T_{all}+G_{aa})/BFL$ | 2.136 | 2.199 | 2.285 | 2.272 | 2.881 | 2.581 | 2.090 |
| $T_3/G_{45}$ | 2.058 | 1.498 | 1.200 | 1.321 | 1.280 | 0.723 | 2.597 |
| $(T_4+T_5)/T_1$ | 1.489 | 1.720 | 1.637 | 1.703 | 2.109 | 1.756 | 1.649 |
| $G_{aa}/T_2$ | 4.081 | 4.233 | 4.200 | 4.302 | 7.159 | 5.749 | 3.943 |

FIG. 32

OPTICAL IMAGING LENS AND ELECTRONIC DEVICE COMPRISING THE SAME

CROSS REFERENCE TO RELATED APPLICATION

This application claims priority to Chinese Application No. 201310578911.8, filed on Nov. 15, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of five lens elements and an electronic device which includes such optical imaging lens set of five lens elements.

2. Description of the Prior Art

In recent years, the popularity of mobile phones and digital cameras makes photography modules (including optical imaging lens set, holder and sensor, etc) well developed. Mobile phones and digital cameras become lighter and thinner, so the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality. The optical imaging lens set of five lens element has been developed.

U.S. Pat. No. 7,480,105, U.S. Pat. No. 7,639,432, U.S. Pat. No. 7,486,449 and U.S. Pat. No. 7,684,127 are disclosed an optical imaging lens set of five lens elements respectively. However, in U.S. Pat. No. 7,480,105 and U.S. Pat. No. 7,639,432, the first lens element and the second lens element have negative refractive power and with positive refractive power respectively; in U.S. Pat. No. 7,486,449 and U.S. Pat. No. 7,684,127, both the first lens element and the second lens element have negative refractive power. This arrangement cannot achieve good optical performance. Besides, in those four patents, the total length of the optical imaging lens set is between 1018 mm, and the size of the optical imaging lens set is too big to satisfy the specification requirements of consumer electronics products.

In addition, U.S. Pat. No. 8,233,224, U.S. Pat. No. 8,363,337 and U.S. Pat. No. 8,000,030 further disclosed an optical imaging lens set of five lens elements respectively. Even though in those patents, the first lens element and the second lens element have positive refractive power and negative refractive power respectively (which is a better arrangement), the configuration of the third to fifth lens elements cannot improve the aberration and shorten the total length simultaneously. Therefore, in consideration of the premise of image quality, these optical imaging lens sets still cannot be effectively shortened. For example, parts of the optical imaging lens set are still about 6 mm, which requires further improvement.

Therefore, how to reduce the total length of a photographic device, but still maintain good optical performance, is an important research objective.

SUMMARY OF THE INVENTION

In the light of the above, the present invention is capable of proposing an optical imaging lens set that is lightweight, and has a low production cost, reduced length, high resolution and high image quality. The optical imaging lens set of five lens elements of the present invention has an aperture stop, a first lens element, a second lens element, a third lens element, a fourth lens element and a fifth lens element sequentially from an object side to an image side along an optical axis.

The present invention provides an optical imaging lens set, from an object side toward an image side in order along an optical axis comprising: a first lens with positive refractive power and a convex object-side surface, a second lens element with negative refractive power and an image-side surface with a concave part in a vicinity of its periphery, a third lens element has an object-side surface with a concave part in a vicinity of its periphery, a fourth lens element with positive refractive power, a concave object-side surface and a convex image-side surface, a fifth lens element with an object-side with a convex part in a vicinity of the optical axis, an image-side surface with a concave part in a vicinity of the optical axis and a convex part in a vicinity of its periphery.

In the optical imaging lens set of five lens elements of the present invention, an air gap $G_{12}$ along the optical axis is disposed between the first lens element and the second lens element, an air gap $G_{23}$ along the optical axis is disposed between the second lens element and the third lens element, an air gap $G_{34}$ along the optical axis is disposed between the third lens element and the fourth lens element, an air gap $G_{45}$ along the optical axis is disposed between the fourth lens element and the fifth lens element, and the sum of total four air gaps between adjacent lens elements from the first lens element to the fifth lens element along the optical axis is $G_{aa}=G_{12}+G_{23}+G_{34}+G_{45}$.

In the optical imaging lens set of five lens elements of the present invention, the first lens element has a first lens element thickness $T_1$ along the optical axis, the second lens element has a second lens element thickness $T_2$ along the optical axis, the third lens element has a third lens element thickness $T_3$ along the optical axis, the fourth lens element has a fourth lens element thickness $T_4$ along the optical axis, the fifth lens element has a fifth lens element thickness $T_5$ along the optical axis, and the total thickness of all the lens elements in the optical imaging lens set along the optical axis is $T_{all}=T_1+T_2+T_3+T_4+T_5$. In addition, the distance between the image-side surface of the fifth lens element to an image plane along the optical axis is BFL (back focal length).

In the optical imaging lens set of five lens elements of the present invention, the relationship $1.8 \leq (G_{34}+G_{45})/G_{23}$ is satisfied.

In the optical imaging lens set of five lens elements of the present invention, the relationship $2.0 \leq G_{aa}/G_{34}$ is satisfied.

In the optical imaging lens set of five lens elements of the present invention, the relationship $T_1/G_{45} \leq 3.5$ is satisfied.

In the optical imaging lens set of five lens elements of the present invention, the relationship $G_{aa}/BFL$ 1.1 is satisfied.

In the optical imaging lens set of five lens elements of the present invention, the relationship $G_{34}/G_{45} \leq 1.7$ is satisfied.

In the optical imaging lens set of five lens elements of the present invention, the relationship $T_{all}/BFL \leq 1.7$ is satisfied.

In the optical imaging lens set of five lens elements of the present invention, the relationship $T_5/G_{23} \leq 1.8$ is satisfied.

In the optical imaging lens set of five lens elements of the present invention, the relationship $1.6 \leq T_{all}/G_{aa}$ is satisfied.

In the optical imaging lens set of five lens elements of the present invention, the relationship $1.8 \leq T_4/T_2$ is satisfied.

In the optical imaging lens set of five lens elements of the present invention, the relationship $G_{aa}/G_{23} \leq 3.8$ is satisfied.

In the optical imaging lens set of five lens elements of the present invention, the relationship $(T_{all}+G_{aa})/BFL \leq 2.6$ is satisfied.

In the optical imaging lens set of five lens elements of the present invention, the relationship $T_3/G_{45} \leq 2.8$ is satisfied.

In the optical imaging lens set of five lens elements of the present invention, the relationship $(T_4+T_5)/T_1 \leq 1.9$ is satisfied.

In the optical imaging lens set of five lens elements of the present invention, the relationship $3.7 \leq G_{aa}/T_2$ is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates a second example of the optical imaging lens set of five lens elements of the present invention.

FIG. 4A illustrates the longitudinal spherical aberration on the image plane of the second example.

FIG. 4B illustrates the astigmatic aberration on the sagittal direction of the second example.

FIG. 4C illustrates the astigmatic aberration on the tangential direction of the second example.

FIG. 4D illustrates the distortion aberration of the second example.

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION

Figure 15:
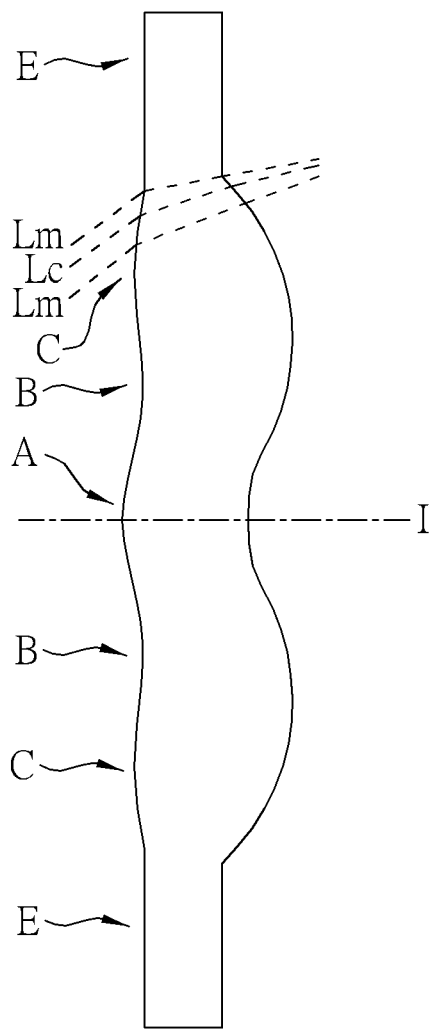
FIG. 15 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 15 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

Figure 1:
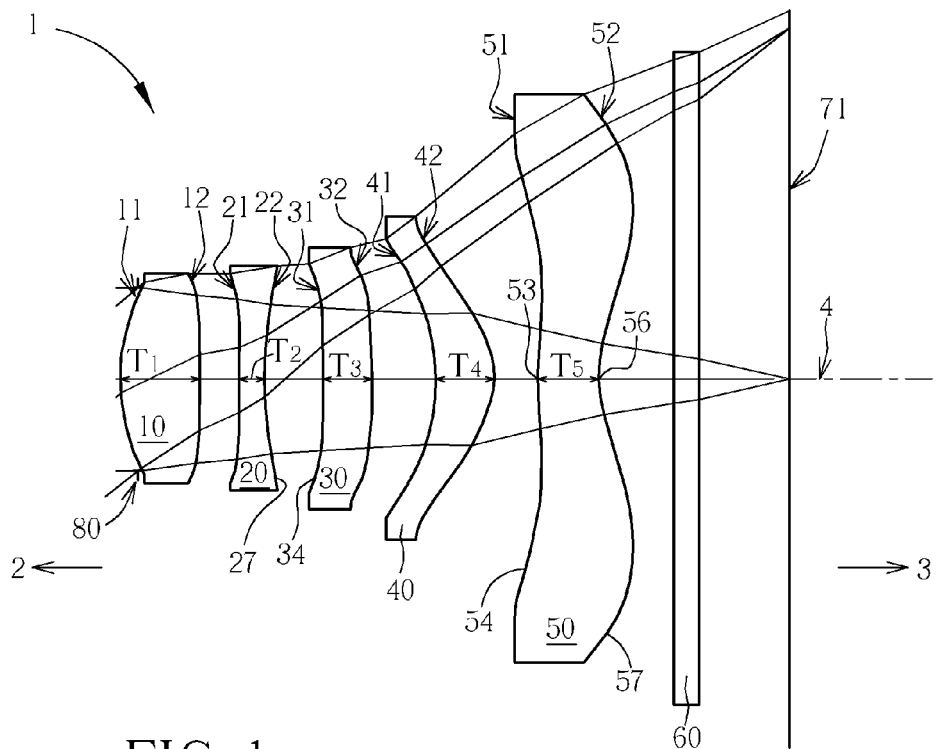
FIG. 1 illustrates a first example of the optical imaging lens set of the present invention.

As shown in FIG. 1, the optical imaging lens set 1 of five lens elements of the present invention, sequentially from an object side 2 (where an object is located) to an image side 3 along an optical axis 4, has a first lens element 10, a second lens element 20, a third lens element 30, a fourth lens element 40, a fifth lens element 50, a filter 60 and an image plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this. There are exclusively five lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed before the first lens element 10. When light emitted or reflected by an object (not shown) which is located at the object side 2 enters the optical imaging lens set 1 of the present invention, it forms a clear and sharp image on the image plane 71 at the image side 3 after passing through the aperture stop 80, the first lens element 10, the second lens element 20, the third lens element 30, the fourth lens element 40, the fifth lens element 50 and the filter 60.

In the embodiments of the present invention, the optional filter 60 may be a filter of various suitable functions, for example, the filter 60 may be an infrared cut filter (IR cut filter), placed between the fifth lens element 50 and the image plane 71.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52.

Each lens element in the optical imaging lens set 1 of the present invention further has a central thickness on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, and the fifth lens element 50 has a fifth lens element thickness $T_5$. Therefore, the total thickness of all the lens elements in the optical imaging lens set 1 along the optical axis 4 is $T_{all}=T_1+T_2+T_3+T_4+T_5$.

In addition, between two adjacent lens elements in the optical imaging lens set 1 of the present invention there is an air gap along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, and an air gap $G_{45}$ is disposed between the fourth lens element 40 and the fifth lens element 50. Therefore, the sum of total four air gaps between adjacent lens elements from the first lens element 10 to the fifth lens element 50 along the optical axis 4 is $G_{aa}=G_{12}+G_{23}+G_{34}+G_{45}$. Besides, the distance between the fifth image-side surface 52 of the fifth lens element 50 to the image plane 71 along the optical axis 4 is BFL.

First Example

Figures 2A, 2B, 2C, 2D:
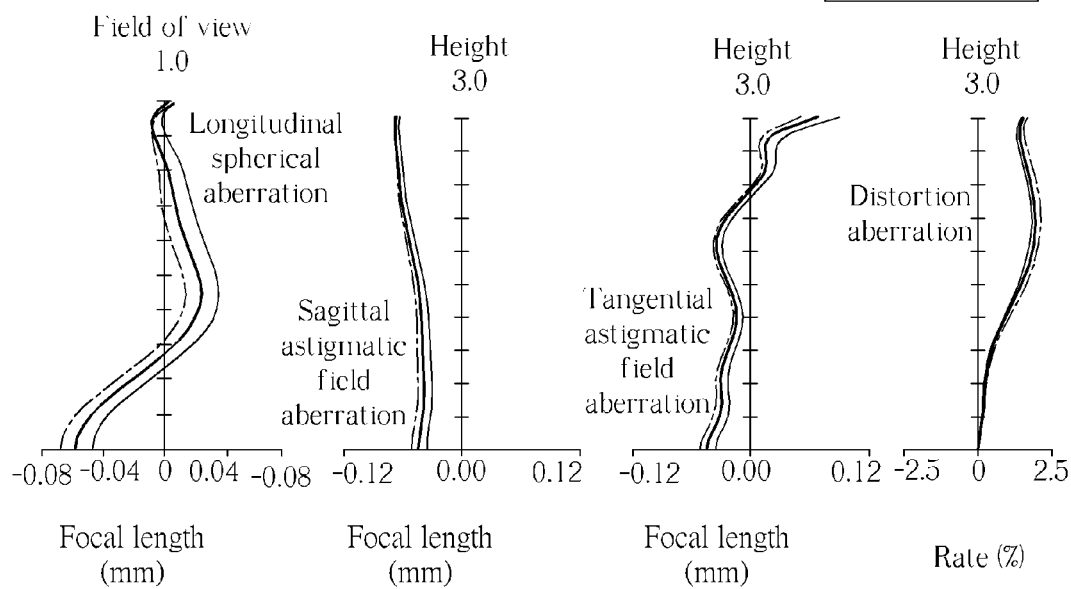
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "image height". The image height is 3.0 mm.

The optical imaging lens set 1 of the first example has five lens elements 10 to 50; each is made of a plastic material and has refractive power. The optical imaging lens set 1 also has an aperture stop 80, a filter 60, and an image plane 71. The aperture stop 80 is provided between the first lens element 10 and object side 2. The filter 60 may be an infrared filter (IR cut filter) to prevent inevitable infrared light from reaching the image plane and adversely affecting the imaging quality.

The first lens element 10 has positive refractive power. The first object-side surface 11 facing toward the object side 2 is a convex surface, and the first image-side surface 12 facing toward the image side 3 is a convex surface too. Both the first object-side surface 11 and the first image-side 12 of the first lens element 10 are aspherical surfaces.

The second lens element 20 has negative refractive power. The second object-side surface 21 facing toward the object side 2 is a concave surface. The second image-side surface 22 facing toward the image side 3 is a concave surface and has a concave part 27 in a vicinity of its circular periphery. Both the second object-side surface 21 and the second image-side surface 22 of the second lens element 20 are aspherical surfaces.

The third lens element 30 has positive refractive power, a third object-side surface 31 facing toward the object side 2 and a third image-side surface 32 facing toward the image side 3. The third object-side surface 31 is a concave surface, having a concave part 34 in a vicinity of its circular periphery. The third image-side surface 32 is a convex surface. Both the third object-side surface 31 and the third image-side surface 32 of the third lens element 30 are aspherical surfaces.

The fourth lens element 40 has positive refractive power. The fourth object-side surface 41 facing toward the object side 2 is a concave surface and the fourth image-side surface 42 facing toward the image side 3 is a convex surface. Both the fourth object-side surface 41 and the fourth image-side 42 of the fourth lens element 40 are aspherical surfaces.

The fifth lens element 50 has negative refractive power, a fifth object-side surface 51 facing toward the object side 2 and a fifth image-side surface 52 facing toward the image side 3. The fifth object-side surface 51 has a convex part 53 in the vicinity of the optical axis and a concave part 54 in a vicinity of its circular periphery. The fifth image-side surface 52 has a concave part 56 in the vicinity of the optical axis and a convex part 57 in a vicinity of its circular periphery. Further, both the fifth object-side surface 51 and the fifth image-side 52 of the fifth lens element 50 are aspherical surfaces. The filter 60 may be an infrared cut filter, and is disposed between the fifth lens element 50 and the image plane 71.

In the optical imaging lens element 1 of the present invention, the object-side surfaces 11/21/31/41/51 and image-side surfaces 12/22/32/42/52 are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and $a_{2i}$ is the aspheric coefficient of the 2i order.

Figure 5:
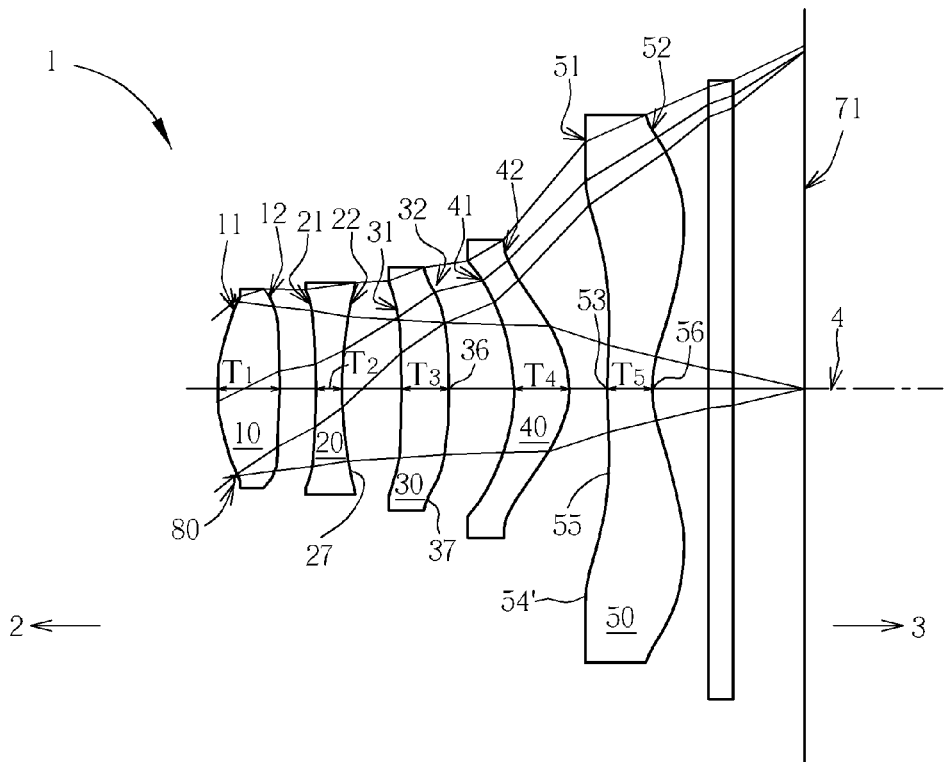
FIG. 5 illustrates a third example of the optical imaging lens set of five lens elements of the present invention.
Figures 6A, 6B, 6C, 6D:
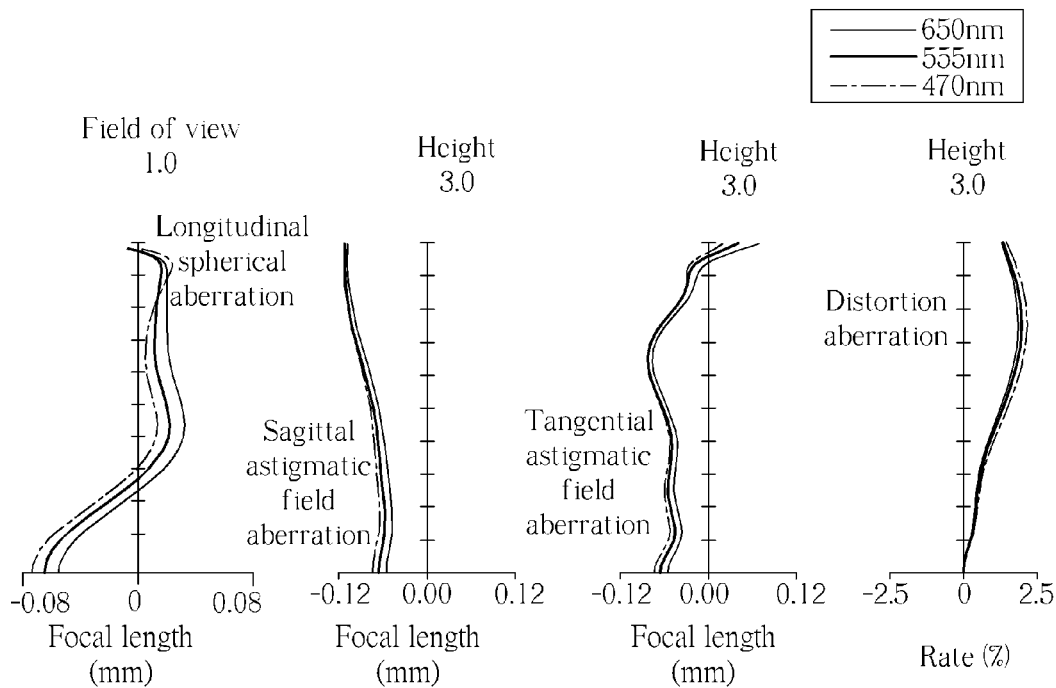
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.
Figure 7:
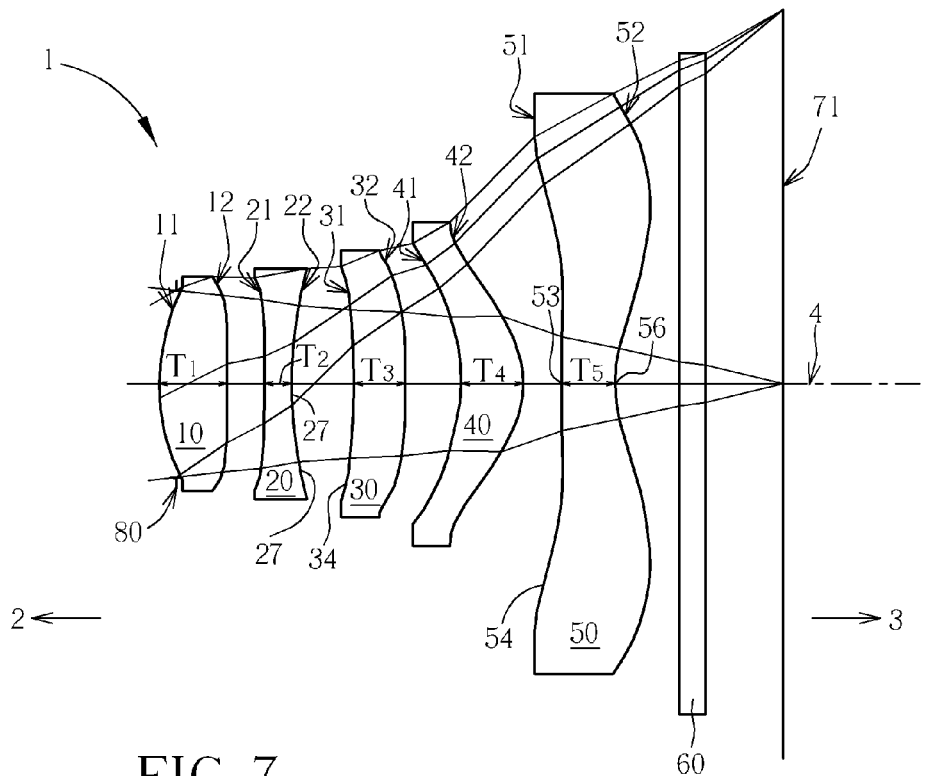
FIG. 7 illustrates a fourth example of the optical imaging lens set of five lens elements of the present invention.
Figures 8A, 8B, 8C, 8D:
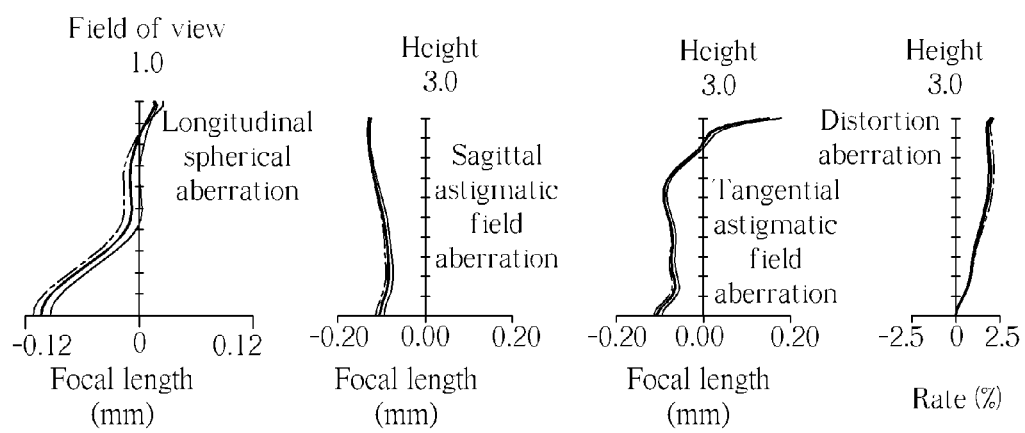
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.
Figure 9:
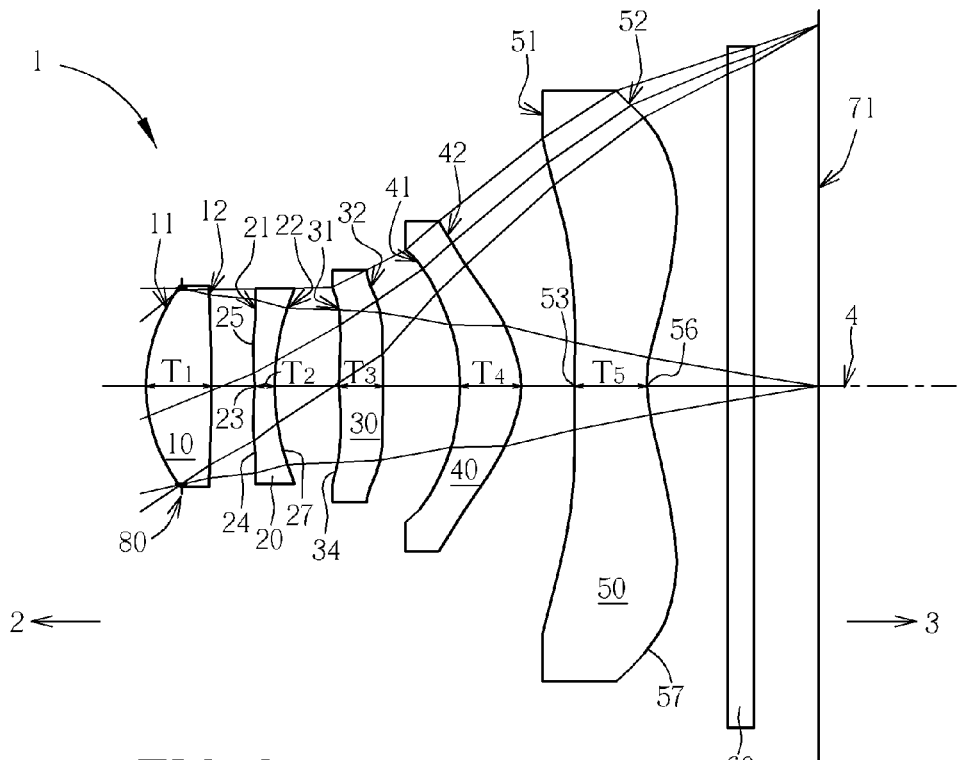
FIG. 9 illustrates a fifth example of the optical imaging lens set of five lens elements of the present invention.
Figures 10A, 10B, 10C, 10D:
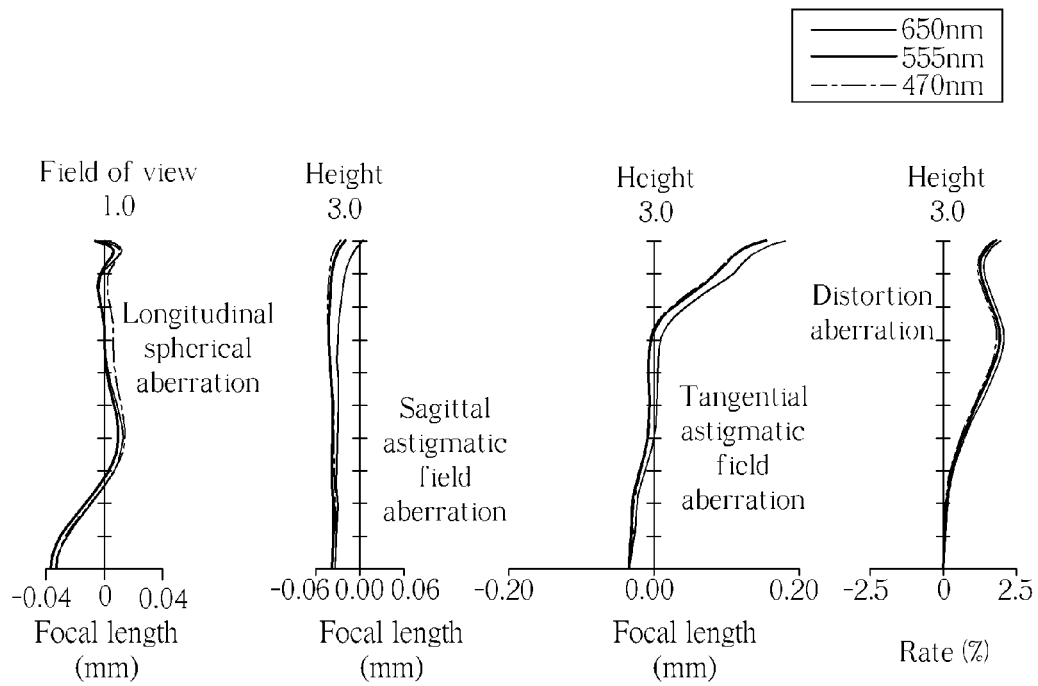
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.
Figure 11:
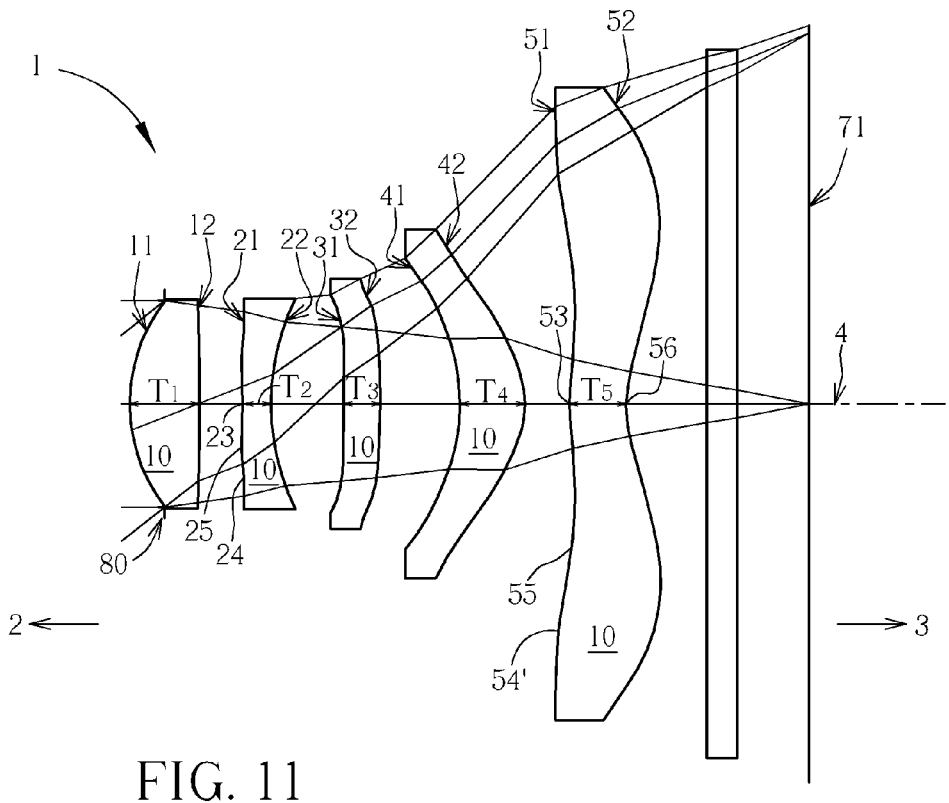
FIG. 11 illustrates a sixth example of the optical imaging lens set of five lens elements of the present invention.
Figures 12A, 12B:
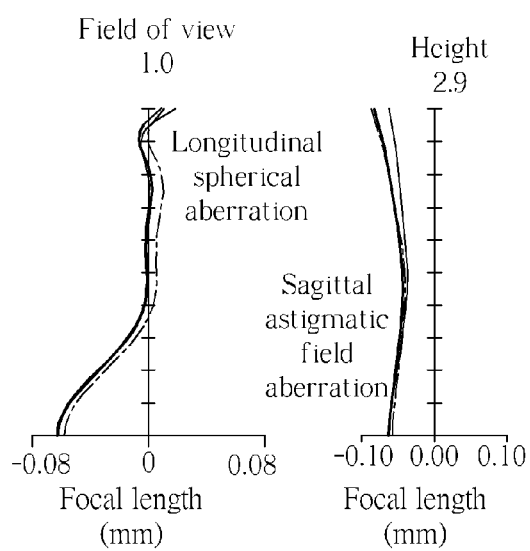
FIG. 12A illustrates the longitudinal spherical aberration on the image plane of the sixth example.
FIG. 12B illustrates the astigmatic aberration on the sagittal direction of the sixth example.
Figures 12C, 12D:
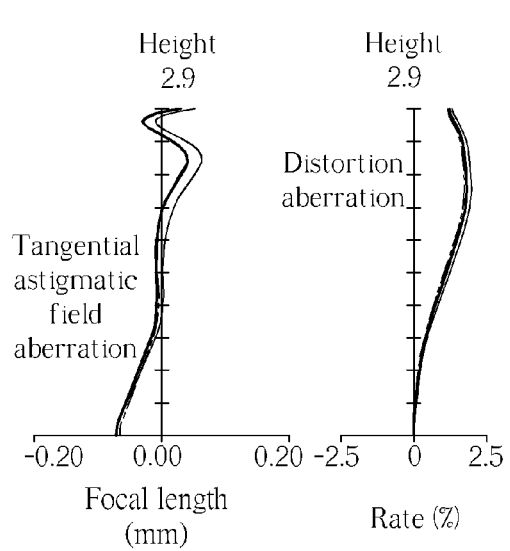
FIG. 12C illustrates the astigmatic aberration on the tangential direction of the sixth example.
FIG. 12D illustrates the distortion aberration of the sixth example.
Figure 13:
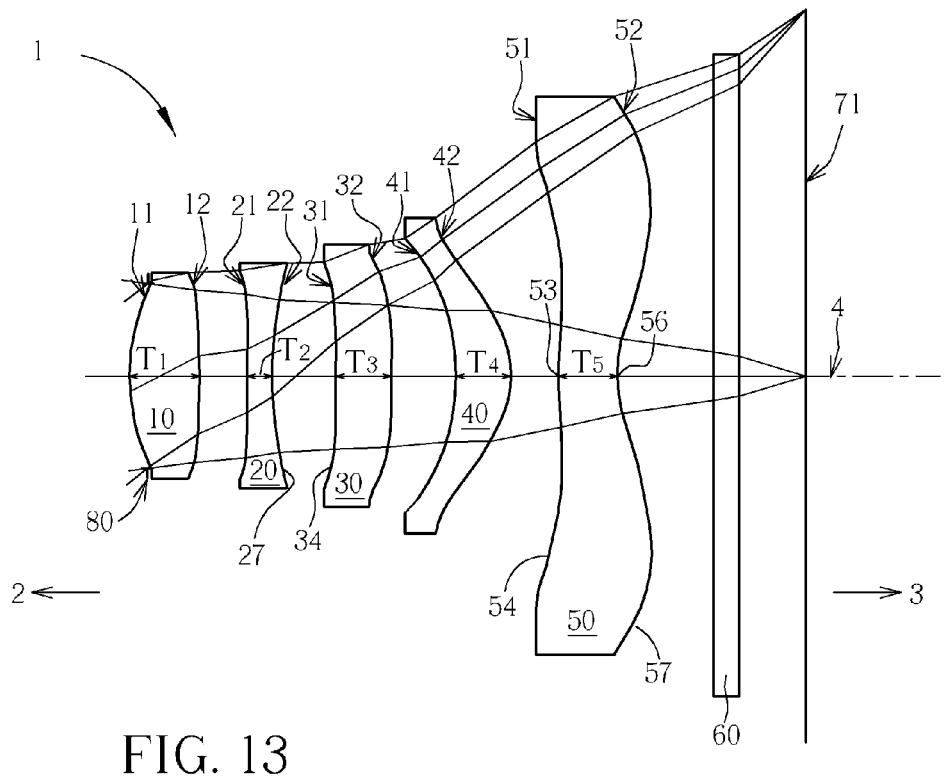
FIG. 13 illustrates a seventh example of the optical imaging lens set of five lens elements of the present invention.
Figures 14A, 14B, 14C, 14D:
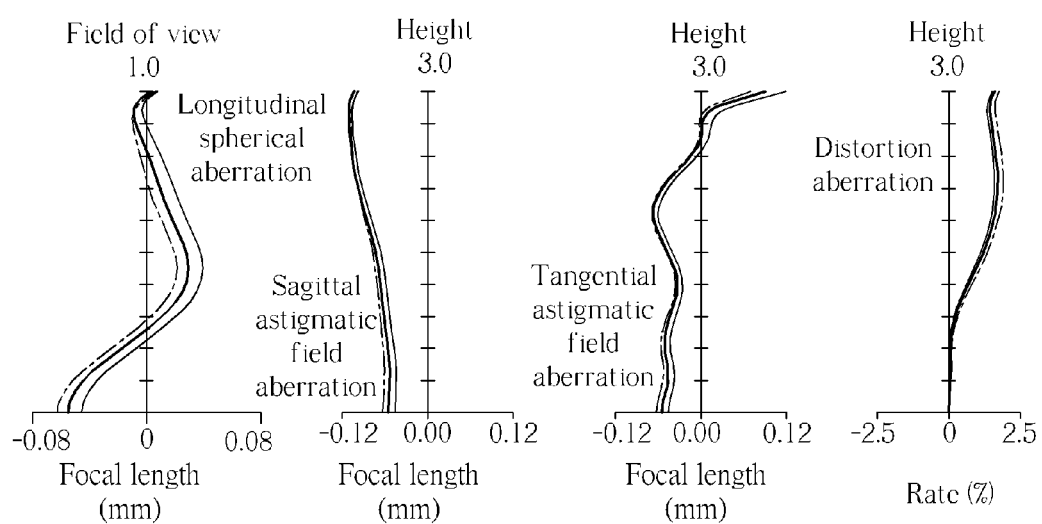
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The effective focal length of the optical imaging lens set is EFL. The length of the optical imaging lens set (the distance from the first object-side surface 11 of the first lens element 10 to the image plane 71) is 4.544 mm. The image height is 3.0 mm. Some important ratios of the first example are as follows:

$(G_{34}+G_{45})/G_{23}=1.804$
$G_{aa}/G_{34}=2.754$
$T_1/G_{45}=3.394$
$T_5/G_{23}=1.796$
$G_{aa}/BFL=0.591$
$G_{34}/G_{45}=1.608$
$T_{all}/BFL=1.546$
$T_{all}/G_{aa}=2.617$
$T_4/T_2=2.263$
$G_{aa}/G_{23}=3.063$
$(T_{all}+G_{aa})/BFL=2.136$
$T_3/G_{45}=2.058$
$(T_4+T_5)/T_1=1.489$
$G_{aa}/T_2=4.081$ Second Example Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 20 while the aspheric surface data are shown in FIG. 21. The length of the optical imaging lens set is 4.388 mm. The image height is 3.0 mm. Some important ratios of the second example are as follows:

$(G_{34+G45})/G_{23}=2.056$
$G_{aa}/G_{34}=3.211$
$T_1/G_{45}=2.031$
$T_5/G_{23}=1.746$
$G_{aa}/BFL=0.651$
$G_{34}/G_{45}=1.020$
$T_{all}/BFL=1.548$
$T_{all}/G_{aa}=2.380$
$T_4/T_2=2.296$
$G_{aa}/G_{23}=3.334$
$(T_{all}+G_{aa})/BFL=2.199$
$T_3/G_{45}=1.498$
$(T_4+T_5)/T_1=1.720$
$G_{aa}/T_2=4.233$ Third Example Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this embodiment, the third image-side surface 32 of the third lens element 30 has a convex part 36 in the vicinity of the optical axis and a concave part 37 in a vicinity of its circular periphery; the fifth object-side surface 51 of the fifth lens element 50 has a convex part 53 in the vicinity of the optical axis and a concave part 54' in a vicinity of its circular periphery as well as a concave part 55 between the optical axis and the circular periphery. The optical data of the third example of the optical imaging lens set are shown in FIG. 22 while the aspheric surface data are shown in FIG. 23. The length of the optical imaging lens set is 4.429 mm. The image height is 3.0 mm. Some important ratios of the third example are as follows:

$(G_{34}+G_{45})/G_{23}=2.145$
$G_{aa}/G_{34}=3.469$
$T_1/G_{45}=1.587$
$T_5/G_{23}=1.363$
$G_{aa}/BFL=0.739$
$G_{34}/G_{45}=0.839$
$T_{all}/BFL=1.545$
$T_{all}/G_{aa}=2.090$
$T_4/T_2=2.065$
$G_{aa}/G_{23}=3.394$
$(T_{all}+G_{aa})/BFL=2.285$
$T_3/G_{45}=1.200$
$(T_4+T_5)/T_1=1.637$
$G_{aa}/T_2=4.200$ Fourth Example Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example. The optical data of the fourth example of the optical imaging lens set are shown in FIG. 24 while the aspheric surface data are shown in FIG. 25. The length of the optical imaging lens set is 4.412 mm. The image height is 3.0 mm. Some important ratios of the fourth example are as follows:

$(G_{34}+G_{45})/G_{23}=2.067$
$G_{aa}/G_{34}=3.329$
$T_1/G_{45}=1.736$
$T_5/G_{23}=1.486$
$G_{aa}/BFL=0.711$
$G_{34}/G_{45}=0.921$
$T_{all}/BFL=1.561$
$T_{all}/G_{aa}=2.194$
$T_4/T_2=2.212$
$G_{aa/G23}=3.298$
$(T_{all}+G_{aa})/BFL=2.272$
$T_3/G_{45}=1.321$
$(T_4+T_5)/T_1=1.703$
$G_{aa}/T_2=4.302$ Fifth Example Please refer to FIG. 9 which illustrates the fifth example of the optical imaging lens set 1 of the present invention. Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example, and in this embodiment, the second object-side surface 21 of the second lens element 20 has a concave part 23 in the vicinity of the optical axis and a concave part 24 in a vicinity of its circular periphery as well as a convex part 25 between the optical axis and the circular periphery; the third object-side surface 31 of the third lens element 30 has a convex part 33 in the vicinity of the optical axis and a concave part 34 in a vicinity of its circular periphery. The optical data of the fifth example of the optical imaging lens set are shown in FIG. 26 while the aspheric surface data are shown in FIG. 27. The length of the optical imaging lens set is 4.361 mm. The image height is 2.934 mm. Some important ratios of the fifth example are as follows:

$(G_{34}+G_{45})/G_{23}=3.326$
$G_{aa}/G_{34}=2.107$
$T_1/G_{45}=1.893$
$T_5/G_{23}=2.442$
$G_{aa}/BFL=0.998$
$G_{34}/G_{45}=1.945$
$T_{all}/BFL=1.883$
$T_{all}/G_{aa}=1.887$
$T_4/T_2=3.194$
$G_{aa}/G_{23}=4.629$
$(T_{all}+G_{aa})/BFL=2.881$
$T_3/G_{45}=1.280$
$(T_4+T_5)/T_1=2.109$
$G_{aa}/T_2=7.159$ Sixth Example Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example, and in this embodiment, the second object-side surface 21 of the second lens element 20 has a concave part 23 in the vicinity of the optical axis and a concave part 24 in a vicinity of its circular periphery as well as a convex part 25 between the optical axis and the circular periphery; the fifth object-side surface 51 of the fifth lens element 50 has a convex part 53 in the vicinity of the optical axis and a convex part 54' in a vicinity of its circular periphery as well as a concave part 55 between the optical axis and the circular periphery. The optical data of the sixth example of the optical imaging lens set are shown in FIG. 28 while the aspheric surface data are shown in FIG. 29. The length of the optical imaging lens set is 4.362 mm. The image height is 2.934 mm. Some important ratios of the sixth example are as follows:

$(G_{34}+G_{45})/G_{23}=2.418$
$G_{aa}/G_{34}=2.738$
$T_1/G_{45}=1.411$
$T_5/G_{23}=1.303$
$G_{aa}/BFL=0.984$
$G_{34}/G_{45}=1.161$
$T_{all}/BFL=1.598$
$T_{all}/G_{aa}=1.624$
$T_4/T_2=2.374$
$G_{aa}/G_{23}=3.557$
$(T_{all}+G_{aa})/BFL=2.581$
$T_3/G_{45}=0.723$
$(T_4+T_5)/T_1=1.756$
$G_{aa}/T_2=5.749$ Seventh Example Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example. The optical data of the seventh example of the optical imaging lens set are shown in FIG. 30 while the aspheric surface data are shown in FIG. 31. The length of the optical imaging lens set is 4.403 mm. The image height is 3.0 mm. Some important ratios of the seventh example are as follows:

$(G_{34}+G_{45})/G_{23}=1.801$
$G_{aa}/G_{34}=2.659$
$T_1/G_{45}=3.253$
$T_5/G_{23}=1.796$
$G_{aa}/BFL=0.580$
$G_{34}/G_{45}=1.796$
$T_{all}/BFL=1.510$
$T_{all}/G_{aa}=2.603$
$T_4/T_2=2.129$
$G_{aa}/G_{23}=3.076$
$(T_{all}+G_{aa})/BFL=2.090$
$T_3/G_{45}=2.597$
$(T_4+T_5)/T_1=1.649$
$G_{aa}/T_2=3.943$ Some important ratios in each example are shown in FIG. 32.

The applicant summarized the efficacy of each embodiment mentioned above as following:
1. The first lens element has positive refractive power, to provide the needed refractive power for the optical imaging lens set. The second lens element has negative refractive power, to correct aberration; the fourth lens element has positive refractive power, to additional provide the needed refractive power for the optical imaging lens set, and simplifying the difficulties in manufacturing process. In addition, the aperture is disposed before the first lens element, the arrangement helps to collect the light and decrease the total length of the optical imaging lens set.
2. The first image-side surface is a convex surface, helping to collect the image light; the second image-side surface has a concave part in the vicinity of its circular periphery; the third object-side surface has a concave part in the vicinity of its circular periphery; the fourth object-side surface is a concave surface; the fourth image-side surface is a convex surface; the fifth image-side surface has a concave part in the vicinity of the optical axis and a convex part in the vicinity of its circular periphery, these lens elements are matched to each other, to ensure the image quality.

In summary, the present invention can achieve excellent image quality by matching the designed lens elements to each other.

In addition, the inventors discover that there are some better ratio ranges for different data according to the above various important ratios. Better ratio ranges help the designers to design the better optical performance and an effectively reduced length of a practically possible optical imaging lens set. For example:

(1) $(G_{34}+G_{45})/G_{23} \geq 1.8$:

Where $G_{23}$, $G_{34}$, $G_{45}$ are the air gaps between adjacent lens elements from the second lens element to the fifth lens element along the optical axis. Since both of the second image-side surface and the third object-side surface are concave surfaces, so $G_{23}$ should be larger in order to avoid $G_{23}$ being too big to shrink the optical imaging lens set, and $G_{23}$ should be designed to be small. On the other hand, $G_{34}$ and $G_{45}$ can be enlarged slightly, as $G_{34}$ and $G_{45}$ is preferably large, and $G_{23}$ is preferably small, therefore, $(G_{34}+G_{45})/G_{23}$ is preferably equal to or larger than 1.8, but ideally, it is suggested that the range may be 1.8~4.0.

(2) $G_{aa}/G_{34} \geq 2.0$:

$G_{aa}$ is the sum of total four air gaps between adjacent lens elements from the first lens element to the fifth lens element along the optical axis. As mentioned above, $G_{34}$ is preferably large, but should not too big to influence the total length of the optical imaging lens set, so $G_{aa}/G_{34}$ is preferably larger than or equal to 2.0, but ideally, it is suggested that the range may be 2.0~4.0.

(3) $G_{aa}/BFL \leq 1.1$; $T_{all}/G_{aa} \geq 1.6$; $G_{aa}/G_{23} \leq 3.8$; $T_{all}+/G_{aa}/BFL \leq 2.6$:

As mentioned above, $G_{34}$ and $G_{45}$ is preferably large, but should not too big to influence the total length of the optical imaging lens set, so $G_{aa}$ should be limited lower than a specific value, therefore, $T_{all}/G_{aa}$ should be larger than a specific value too. For example, $G_{aa}/BFL$ should be lower than or equal to 1.1, and ideally, it is suggested that the range may be 0.4~1.1; $T_{all}/G_{aa}$ should be larger than or equal to 1.6, and ideally, it is suggested that the range may be 1.63~3.0; $G_{aa}/G_{23}$ should be lower than or equal to 3.8, and ideally, it is suggested that the range may be 2.8~3.8; $(T_{all}+G_{aa})/BFL$ should be lower than or equal to 2.6, and ideally, it is suggested that the range may be 1.5~2.6.

(4) $T_1/G_{45} \leq 3.5$; $G_{34}/G_{45} \leq 1.8$; $T_3/G_{45} \leq 2.8$:

As mentioned above, $G_{45}$ is preferably large, besides, $T_1$, $T_3$ and $G_{34}$ should also be small to reduce the total length, therefore, $T_1/G_{45}$, $G_{34}/G_{45}$ and $T_3/G_{45}$ are preferably small. For example, T1/G45 should be lower than or equal to 3.5, and ideally, it is suggested that the range may be 1.06~3.5; $G_{34}/G_{45}$ should be lower than or equal to 1.8, and ideally, it is suggested that the range may be 0.7~1.8; $T_3/G_{45}$ should be lower than or equal to 2.8, and ideally, it is suggested that the range may be 0.5~2.8.

(5) $T_{all}/BFL \leq 1.7$:

$T_{all}$ is the total thickness of all the lens elements in the optical imaging lens set along the optical axis, the total length can be shrunk if $T_{all}$ can be reduced, as the filter and others components should be disposed between the fifth lens element and the image plane, so BFL cannot be changed unlimitedly. Therefore, $T_{all}/BFL$ is preferably small. For example, should be lower than or equal to 1.7, and ideally, it is suggested that the range may be 1.2~1.7.

(6) $T_4/T_2$ is suggested to be larger than or equal to 1.8, and $(T_4+T_5)/T_1$ is suggested to be lower than or equal to 1.9, to ensure each lens elements have better arrangement. Ideally, $T_4/T_2$ is suggested that the range may be 1.8~3.5; $(T_4+T_5)/T_1$ is suggested that the range may be 1.2~1.9.

(7) $G_{aa}/T_2 \geq 3.7$:

Compared with the third, fourth and fifth lens elements, the second lens element is easier to be shrunk, therefore, $T_2$ should be small and $G_{aa}/T_2$ should be large. For example, $G_{aa}/T_2$ is preferably larger than or equal to 3.7, ideally, it is suggested that the range may be 3.7~8.0.

Figure 16:
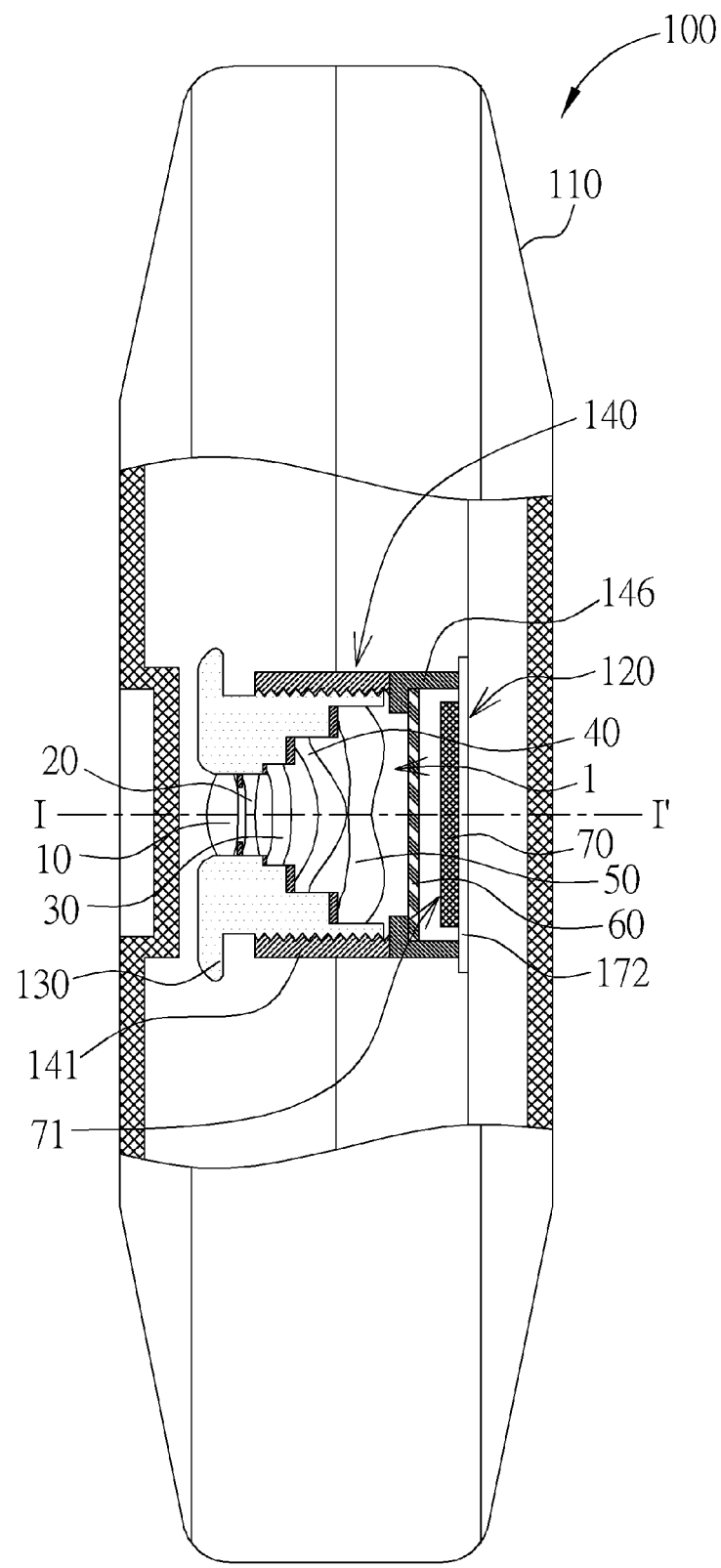
FIG. 16 illustrates a first preferred example of the portable electronic device with an optical imaging lens set of the present invention.

The optical imaging lens set 1 of the present invention may be applied to a portable electronic device. Please refer to FIG. 16. FIG. 16 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 16 as an example, but the portable electronic device 100 is not limited to a mobile phone.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 60 may be omitted in other examples although the optional filter 60 is present in this example. The case 110, the barrel 130, and/or the module housing unit 140 may be a single element or consist of a plurality of elements, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as about 4.5 mm, this ideal length allows the dimensions and the size of the portable electronic device 100 to be smaller and lighter, but excellent optical performance and image quality are still possible. In such a way, the various examples of the present invention satisfy the need for economic benefits of using fewer raw materials in addition to satisfying the trend for a smaller and lighter product design and consumers' demands.

Figure 17:
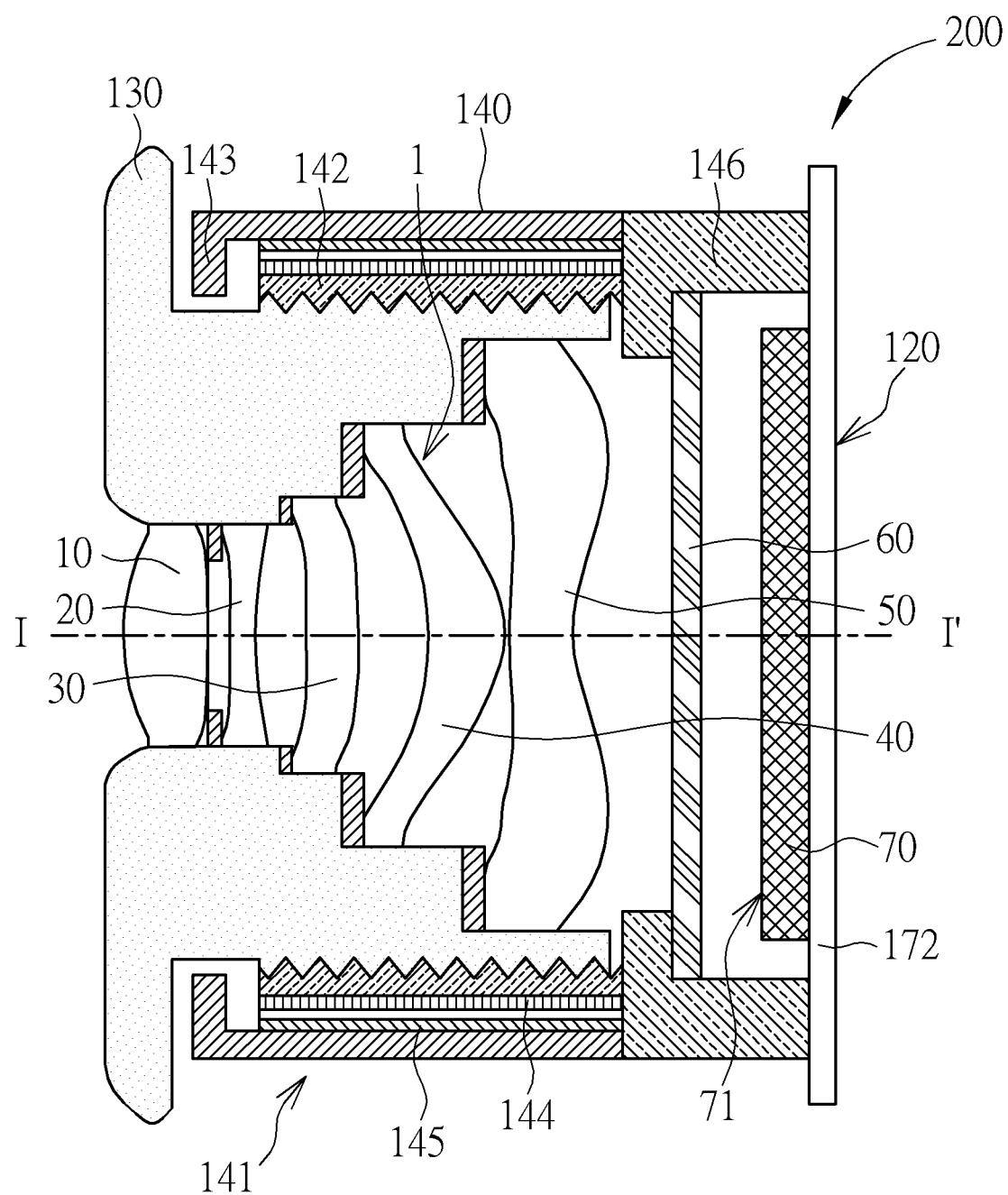
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 60, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, from an object side toward an image side in order along an optical axis comprising: an aperture stop, a first lens element, a second lens element, a third lens element, a fourth lens element and a fifth lens element, all of the first lens element, the second lens element, the third lens element, the fourth lens element and the fifth lens element having refractive power, said first to fifth lens elements having an object-side surface facing toward the object side as well as an image-side surface facing toward the image side, wherein:

the first lens element with positive refractive power, has an object-side surface, and the object-side surface is a convex surface;

the second lens element with negative refractive power, has an image-side surface with a concave part in a vicinity of its periphery;

the third lens element has an object-side surface with a concave part in a vicinity of its periphery;

the fourth lens with positive refractive power, has an object-side surface and an image-side surface, the object-side surface is a concave surface and the image-side surface is a convex surface;

the fifth lens has an object-side surface with a convex part in a vicinity of the optical axis, and an image-side surface with a concave part in a vicinity of the optical axis as well as a convex part in a vicinity of its periphery;

the optical imaging lens set does not include any lens element with refractive power other than said first lens element, second lens element, third lens element, fourth lens element and fifth lens element, in addition, an air gap $G_{12}$ along the optical axis is disposed between the first lens element and the second lens element, an air gap $G_{23}$ along the optical axis is disposed between the second lens element and the third lens element, an air gap $G_{34}$ along the optical axis is disposed between the third lens element and the fourth lens element, an air gap $G_{45}$ along the optical axis is disposed between the fourth lens element and the fifth lens element, the sum of total four air gaps between adjacent lens elements from the first lens element to the fifth lens element along the optical axis is $G_{aa}$, the first lens element has a first lens element thickness $T_1$ along the optical axis, the second lens element has a second lens element thickness $T_2$ along the optical axis, the third lens element has a third lens element thickness $T_3$ along the optical axis, the fourth lens element has a fourth lens element thickness $T_4$ along the optical axis, the fifth lens element has a fifth lens element thickness $T_5$ along the optical axis, and the total thickness of all the lens elements in the optical imaging lens set along the optical axis is $T_{all}$, the distance between the image-side surface of the fifth lens element to an image plane along the optical axis is BFL, and satisfy the relationships $1.8 \leq (G_{34}+G_{45})/G_{23}$ and $(T_{all}+G_{aa})/BFL \leq 2.6$.

2. The optical imaging lens set of claim 1, further satisfy a relationship $2.0 \leq G_{aa}/G_{34}$.

3. The optical imaging lens set of claim 2, further satisfy a relationship $T_1/G_{45} \leq 3.5$.

4. The optical imaging lens set of claim 3, further satisfy a relationship $G_{aa}/BFL \leq 1.1$.

5. The optical imaging lens set of claim 4, further satisfy a relationship $G_{34}/G_{45} < 1.7$.

6. The optical imaging lens set of claim 5, further satisfy a relationship $T_{all}/BFL \leq 1.7$.

7. The optical imaging lens set of claim 2, further satisfy a relationship $T_5/G_{23} < 1.8$.

8. The optical imaging lens set of claim 7, further satisfy a relationship $1.6 \leq T_{all}/G_{aa}$.

9. The optical imaging lens set of claim 8, further satisfy a relationship $1.8 \leq T_4/T_2$.

10. The optical imaging lens set of claim 1, further satisfy a relationship $T_1/G_{45} \leq 3.5$.

11. The optical imaging lens set of claim 10, further satisfy a relationship $T_5/G_{23} \leq 1.8$.

12. The optical imaging lens set of claim 11, further satisfy a relationship $G_{aa}/G_{23} \leq 3.8$.

13. The optical imaging lens set of claim 1, further satisfy a relationship $T_5/G_{23} \leq 1.8$.

14. The optical imaging lens set of claim 13, further satisfy a relationship $T_3/G_{45} \leq 2.8$.

15. The optical imaging lens set of claim 14, further satisfy a relationship $(T_4+T_5)/T1 \leq 1.9$.

16. The optical imaging lens set of claim 15, further satisfy a relationship $3.7 \leq G_{aa}/T_2$.

17. An electronic device, comprising:
a case; and
an image module disposed in said case and comprising:
an optical imaging lens set of claim 1;
a barrel for the installation of said optical imaging lens set;
a module housing unit for the installation of said barrel;
a substrate for the installation of said module housing unit; and
an image sensor disposed on the substrate and disposed at an image side of said optical imaging lens set.

* * * * *